(12) United States Patent
Converset et al.

(10) Patent No.: US 12,464,269 B2
(45) Date of Patent: Nov. 4, 2025

(54) SYSTEMS AND METHODS FOR WELLSITE CONTROL

(71) Applicant: Schlumberger Technology Corporation, Sugar Land, TX (US)

(72) Inventors: Julien Converset, Sugar Land, TX (US); Emmanuel Coste, London (GB); Graeme Paterson, London (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/442,278

(22) Filed: Feb. 15, 2024

(65) Prior Publication Data
US 2024/0284077 A1    Aug. 22, 2024

Related U.S. Application Data

(63) Continuation of application No. 18/170,595, filed on Feb. 17, 2023, now Pat. No. 11,962,957.

(51) Int. Cl.
    *H04Q 9/00*         (2006.01)
    *E21B 41/00*       (2006.01)

(52) U.S. Cl.
    CPC .............. *H04Q 9/00* (2013.01); *E21B 41/00* (2013.01); *H04Q 2209/823* (2013.01)

(58) Field of Classification Search
CPC .... H04Q 9/00; H04Q 2209/823; E21B 41/00; E21B 2200/22; E21B 44/00
See application file for complete search history.

(56) References Cited

U.S. PATENT DOCUMENTS

| | | | |
|---|---|---|---|
| 6,760,665 B1 * | 7/2004 | Francis | G01V 1/40 702/6 |
| 10,794,153 B2 | 10/2020 | Meehan | |
| 11,149,542 B2 | 10/2021 | Pietrzyk | |
| 11,255,163 B2 | 2/2022 | Nazhan | |
| 11,467,300 B2 | 10/2022 | Salman | |
| 11,492,858 B2 | 11/2022 | Abdulrazzaq | |
| 11,613,985 B2 | 3/2023 | Rendusara | |
| 11,625,162 B2 | 4/2023 | Feinstein | |

(Continued)

FOREIGN PATENT DOCUMENTS

| | | |
|---|---|---|
| WO | 2021119313 A1 | 6/2021 |
| WO | 2023004026 A1 | 1/2023 |

OTHER PUBLICATIONS

Partial Search Report European Application No. 24158381.4 dated Jun. 13, 2024, 13 pages.

(Continued)

*Primary Examiner* — Amine Benlagsir
(74) *Attorney, Agent, or Firm* — Jeffrey D. Frantz

(57) ABSTRACT

A system and method include receiving a drill plan and wellsite information associated with a well site that includes at least one of: surface information and downhole information. The system and method also include inputting the drill plan and the wellsite information into a machine learning model and determining at least one at least control command based on at least one of: the wellsite information and the drill plan. The system and method additionally include transmitting the at least one control command to a notification destination to change at least one operating parameter of at least one equipment at the wellsite.

18 Claims, 6 Drawing Sheets

(56) References Cited

U.S. PATENT DOCUMENTS

| | | | |
|---|---|---|---|
| 12,203,356 B2* | 1/2025 | Zhang | E21B 7/04 |
| 12,223,692 B2* | 2/2025 | Xu | G06V 10/82 |
| 2002/0195275 A1* | 12/2002 | Brand | E21B 7/04 |
| | | | 175/24 |
| 2003/0028269 A1* | 2/2003 | Spriggs | G06F 3/0482 |
| | | | 700/83 |
| 2011/0155378 A1* | 6/2011 | Cabanilla | C09K 8/94 |
| | | | 166/309 |
| 2015/0107901 A1* | 4/2015 | Eriksson | E21B 47/12 |
| | | | 175/40 |
| 2016/0281479 A1* | 9/2016 | Rendusara | G08B 21/182 |
| 2017/0122099 A1* | 5/2017 | Yao | E21B 49/003 |
| 2020/0117318 A1 | 4/2020 | Jayabal | |
| 2021/0019350 A1 | 1/2021 | Dixon | |
| 2021/0019351 A1 | 1/2021 | Dixon | |
| 2021/0348490 A1 | 11/2021 | Wheatley | |
| 2022/0003058 A1 | 1/2022 | Abdulrazzaq | |
| 2022/0178248 A1 | 6/2022 | Chambon | |
| 2022/0229200 A1 | 7/2022 | Torlov | |
| 2022/0403733 A1* | 12/2022 | Lloyd | E21B 47/26 |

OTHER PUBLICATIONS

Extended European Search Report EP Application No. 24158381.4 dated Sep. 3, 2024, 14 pages.

* cited by examiner

SYSTEMS AND METHODS FOR WELLSITE CONTROL

CROSS-REFERENCE TO RELATED APPLICATIONS

This application is a continuation and claims the benefit of and priority to U.S. application Ser. No. 18/170,595, filed on 17 Feb. 2023, which is incorporated by reference herein in its entirety.

BACKGROUND

Wellbores may be drilled into a surface location or seabed for a variety of exploratory or extraction purposes. For example, a wellbore may be drilled to access fluids, such as liquid and gaseous hydrocarbons, stored in subterranean formations and to extract the fluids from the formations. A variety of drilling methods may be utilized depending partly on the characteristics of the formation through which the wellbore is drilled.

After drilling of the wellbore is complete, the wellbore is used to extract the fluids, such as liquid and gaseous hydrocarbons. During production of the fluids, the wellbore can experience a variety of conditions including changes in the fluid produced and changes to the associated equipment used in managing the wellsite.

Whether drilling or managing fluid production at the wellsite, sensors monitor operating and environmental conditions. Raising incorrect alarms to an operator can result in the operator ignoring the system and/or losing trust in the system. Similarly, raising alarms to the wrong operator or user can result in response delays and/or that operator or user ignoring the system and/or losing trust in the system.

SUMMARY

According to one aspect, a method may include receiving a drill plan and wellsite information associated with a well site that includes at least one of: surface information and downhole information. A method may also include inputting the drill plan and the wellsite information into a machine learning model and determining at least one at least control command based on at least one of: the wellsite information and the drill plan. The method may additionally include transmitting the at least one control command to a notification destination to change at least one operating parameter of at least one equipment at the wellsite.

According to another aspect, a system may include a processor. The system may additionally include memory accessible by the processor. The system may further include processor-executable instructions stored in the memory and executable to instruct the system to receive a drill plan and wellsite information associated with a well site that includes at least one of: surface information and downhole information, input the drill plan and the wellsite information into a machine learning model and determine at least one at least control command based on at least one of: the wellsite information and the drill plan, and transmit the at least one control command to a notification destination to change at least one operating parameter of at least one equipment at the wellsite.

According to yet another aspect, a non-transitory computer-readable storage medium storing instructions that when executed by a computer, which includes a processor performs a method, the method may include receiving a drill plan and wellsite information associated with a well site that includes at least one of: surface information and downhole information. The method may additionally include inputting the drill plan and the wellsite information into a machine learning model and determining at least one at least control command based on at least one of: the wellsite information and the drill plan. The method may further include transmitting the at least one control command to a notification destination to change at least one operating parameter of at least one equipment at the wellsite.

In some embodiments, a method for wellsite control includes, at a computing device, receiving sensor information from one or more sensors; determining at least one notification option based at least partially on the sensor information; selecting at least one notification option based at least partially on the sensor information; and sending a notification to a notification destination.

In some embodiments, a method for wellsite control includes, at a computing device, receiving sensor information from one or more sensors; determining at least one notification option based at least partially on the sensor information; providing for display of a graphical interface, wherein the graphical interface comprises a first sub-window showing the sensor information and the graphical interface further comprises a second sub-window showing one or more notification options based at least partially on the sensor information; receiving, via the graphical interface, input data indicating a suggested notification from the notification options; and sending a notification to a notification destination.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and aspects of embodiments of the disclosure will be set forth in the description which follows, and in part will be obvious from the description, or may be learned by the practice of such embodiments. The features and aspects of such embodiments may be realized and obtained by means of the instruments and combinations particularly pointed out in the appended claims. These and other features will become more fully apparent from the following description and appended claims or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, non-schematic drawings should be considered as being to scale for some embodiments of the present disclosure, but not to scale for other embodiments contemplated herein. Understanding that the drawings depict some example embodiments, the embodiments will be described and explained with additional specificity and detail through the use of the accompanying drawings in which:

FIG. 3-1 is a flowchart illustrating a method of wellsite control, according to some embodiments of the present disclosure;

FIG. 3-2 is a flowchart illustrating another method of wellsite control, according to some embodiments of the present disclosure;

DETAILED DESCRIPTION

Figure 1:
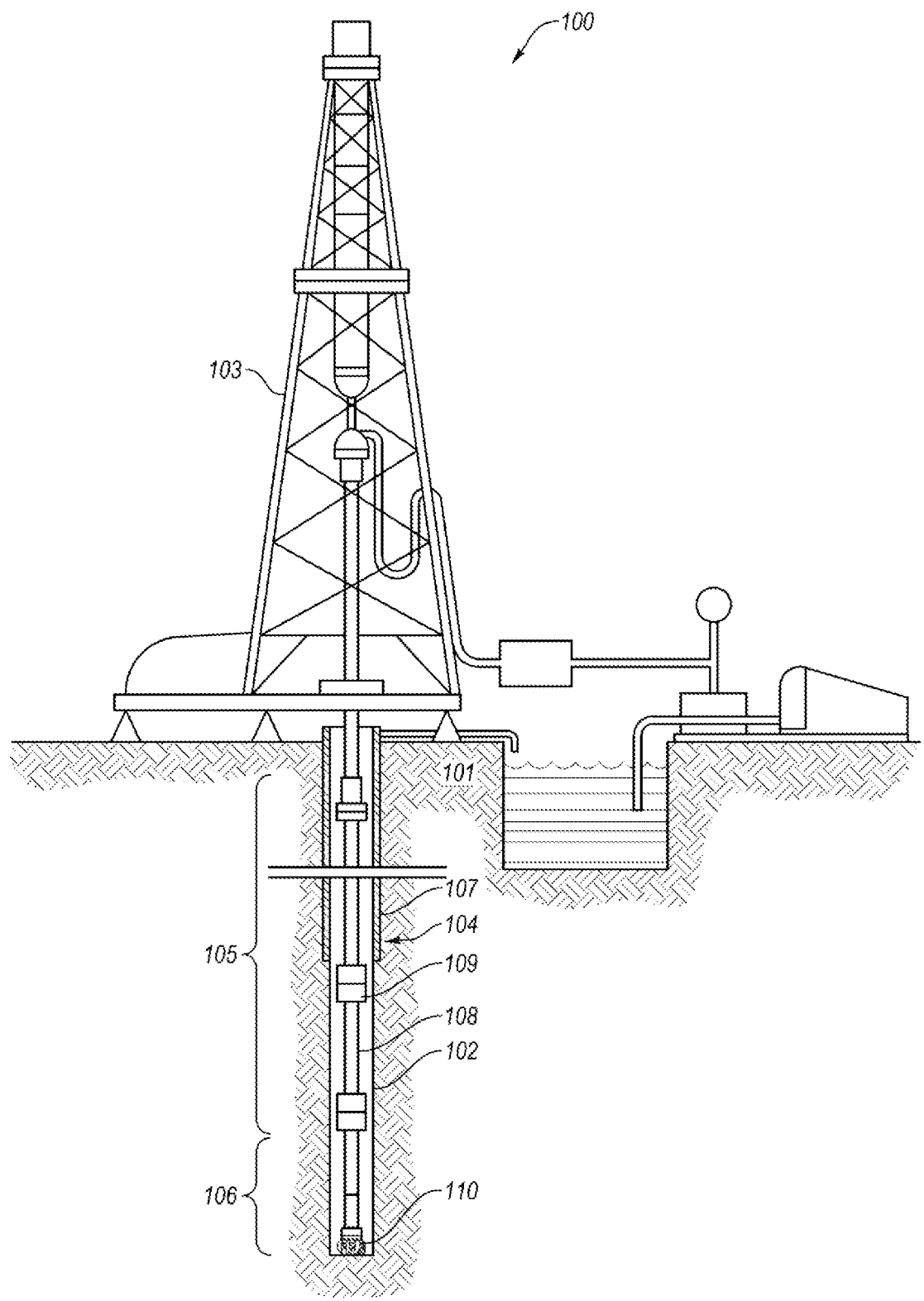
FIG. 1 is a side schematic view of a drilling system, according to some embodiments of the present disclosure.

Embodiments of the present disclosure generally relate to devices, systems, and methods for wellsite controls. It should be understood that while the present disclosure will describe the communication of alerts and notifications to and from a wellsite, a wellsite may be a drilling site for the future production of fluids, a producing well that is managed during production, or a wellsite that is managed after fluids are not actively extracted. The systems and method described herein may be used for wellsite controls at any stage of the creation, operational lifetime, or remediation of the wellbore.

In some embodiments, systems and methods for wellsite control include one or more sensors located at, in, or near the wellsite that are in data communication with a computing device. The computing device is in data communication with a recommendation module that allows the computing device to interpret and/or process the incoming sensor information. The computing device can then provide a notification to one or more operators, users, or locations based on the sensor information. By notifying operators, users, or locations of the wellsite more accurately than conventional alarm systems, the systems and methods according to the present disclosure can allow for more accurate and precise responses to wellsite conditions in a shorter time.

More particularly, system and methods for wellsite control according to the present disclosure utilize remote resources, both human and computational, to provide improvements to notification validation, routing, and response. In some embodiments, remote personnel provide validation, routing, and response to the information provided from the wellsite. In some embodiments, a machine learning (ML) model or other computerized model provides validation, routing, and response to the information provided from the wellsite. In some embodiments, the validation, routing, and response is at least partially automated such that one or more users are removed from a conventional communication channel to reduce response delays or durations.

In some embodiments, one or more sensors at a wellsite provide measurements, alerts, or other sensor information to an intermediate server. The server can analyze the sensor information and provide validation, routing, response, or combinations thereof of the sensor information to a user or equipment at the wellsite. In some embodiments, the validation, routing, response, or combinations thereof are based on historic models or recorded prior validation, routing, or responses. In some embodiments, the server relays the sensor information (and, optionally, additional information) to a remote user, such as in a town site remote from the wellsite, for validation, routing, response, or combinations thereof. For example, the remote user may receive or obtain additional information to supplement a decision regarding the sensor information prior to validating, routing, or otherwise responding to the sensor information. The additional information may include environmental information (such as weather), formation information (such as seismic information, rock type, lithology type, or historic fluid production information), drill plan information, secondary sensor information from other sensors at the wellsite, or outputs from computational models performed using any combination of the sensory information and additional information that are computationally intensive and are unable or impractical to be performed at the wellsite. In at least one example, a system or method of the present disclosure can leverage cloud computing resources to determine a particular validation, routing, response, or combination thereof to provided sensor information.

In some embodiments, a receiving user of the notification and/or response at the wellsite can provide feedback to the remote user at the townsite and/or to the computer system that allows recording of the feedback to the ML model or other computerized model of the computing device. The feedback can be captured, recorded, or integrated in the computerized model as a future recommendation for validation, routing, response, or combinations thereof, as an input to the computerized model for recursive models, or as a new or modified middle node in an ML model. The refinement of the automated response or automated suggestions for response in the wellsite controls can improve safety, performance, and efficiency of the wellsite systems.

As described herein, the wellsite may be a drill site, a producing wellsite, or a non-producing wellsite, although a drill rig will be described herein. FIG. 1 shows one example of a drilling system 100 for drilling an earth formation 101 to form a wellbore 102. The drilling system 100 includes a drill rig 103 used to turn a drilling assembly 104 which extends downward into the wellbore 102. The drilling assembly 104 may include a drill string 105 and a bottom-hole assembly (BHA) 106 attached to the downhole end of drill string 105. Where the drilling system 100 is used for drilling formation, a drill bit 110 can be included at the downhole end of the BHA 106.

The drill string 105 may include several joints of drill pipe 108 connected end-to-end through tool joints 109. The drill string 105 transmits drilling fluid through a central bore and can transmit rotational power from the drill rig 103 to the BHA 106. In some embodiments, the drill string 105 may further include additional components such as subs, pup joints, etc. The drill pipe 108 provides a hydraulic passage through which drilling fluid 111 is pumped from the surface. The drilling fluid 111 discharges through selected-size nozzles, jets, or other orifices in the bit 110 for the purposes of cooling the bit 110 and cutting structures thereon, for lifting cuttings out of the wellbore 102 as it is being drilled, and for preventing the collapse of the wellbore 102. The drilling fluid 111 carries drill solids including drill fines, drill cuttings, and other swarf from the wellbore 102 to the surface. The drill solids can include components from the earth formation 101, the drilling assembly 104 itself, from other man-made components (e.g., plugs, lost tools/components, etc.), or combinations thereof.

The BHA 106 may include the bit 110 or other components. An example BHA 106 may include additional or other components (e.g., coupled between to the drill string 105 and/or the bit 110). Examples of additional BHA components include drill collars, stabilizers, measurement-while-drilling (MWD) tools, logging-while-drilling (LWD) tools, downhole motors, underreamers, directional steering tools, section mills, hydraulic disconnects, jars, vibration or dampening tools, other components, or combinations of the foregoing.

In general, the drilling system 100 may include other drilling components and accessories, such as special valves (e.g., kelly cocks, blowout preventers, safety valves, centrifuges, shaker tables, and rheometers). Additional components included in the drilling system 100 may be considered a part of the surface system (e.g., drill rig 103, drilling assembly 104, drill string 105, or a part of the BHA 106, depending on their locations and/or use in the drilling system 100).

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits, roller cone bits, impregnated bits, or coring bits. In other embodiments, the bit 110 may be a mill used for removing metal, composite, elastomer, other materials downhole, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to surface by the drilling fluid 111 or may be allowed to fall downhole. The conditions of the equipment of the drilling system 100, the formation 101, the wellbore 102, the drilling fluid 111, or other part of the wellsite can change during operations. Sensors within the wellsite provide information to make operation decisions for efficiency, safety, and other reasons.

In some embodiments, a wellsite includes a plurality of sensors at the surface, in the wellbore (e.g., the downhole environment), in the formation, on or in equipment (such as any equipment described in relation to FIG. 1), or elsewhere that provide sensor information to a controller or a computing device. In some embodiments, controller or computing device is located in a control building at the wellsite. In some embodiments, the controller or computing device is located remotely from the wellsite, such as a remote server or computing device at a townsite. The sensor information may include measurements of operating parameters, measurements of environmental conditions, or alerts that an operating parameter or environmental condition is outside of or has exceeded set thresholds. For example, a sensor information may be a weight-on-bit (WOB) measurement that provides the controller or computing device with a nominal measured value for the WOB during drilling. The sensor information may be a downhole fluid pressure measurement, such as a nominal pressure value during fluid production of a wellsite. In some examples, the sensor information may be an alert that vibration in the BHA has exceeded a safety threshold and the sensor information may or may not include the nominal shock and/or vibration value (such as a rotational acceleration value) with the alert based on exceeding the preset safety threshold.

Figure 2:
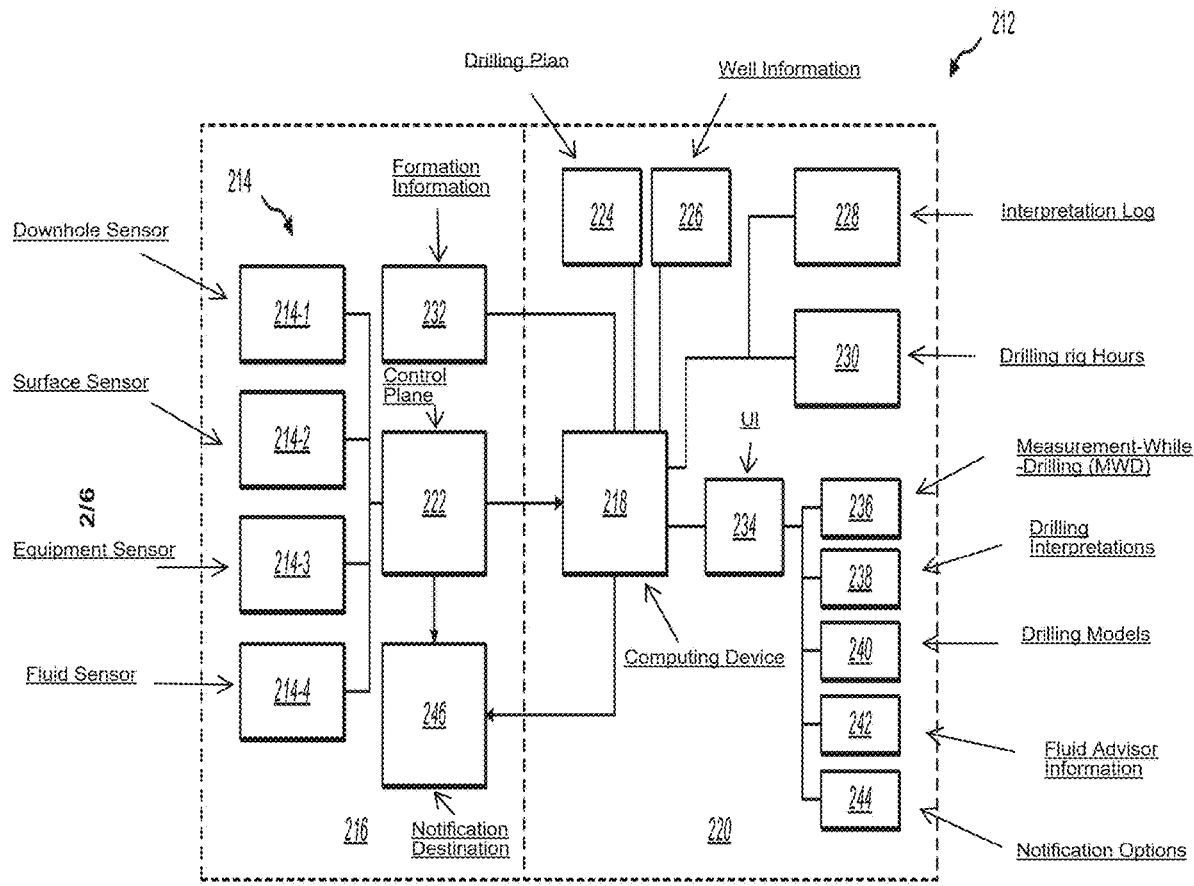
FIG. 2 is a system diagram of a system for wellsite control, according to some embodiments of the present disclosure.

FIG. 2 is a system diagram of a system 212 for wellsite control. The system 212 includes a plurality of sensors 214 located proximate the wellsite 216 and a computing device 218 located remotely from the wellsite 216, such as in a townsite 220. While FIG. 2 illustrates the computing device 218 in the townsite 220, in some embodiments, the computing device 218 is a server or a cloud computing device that is located remotely from both the wellsite 216 and the townsite 220. In some embodiments, the system 212 includes additional displays and/or input devices in the townsite 220 to allow a remote user in the townsite 220 to provide validation, routing, response, or combinations thereof to the wellsite 216. In some embodiments, the system 212 can analyze and provide validation, routing, response, or combinations thereof to sensor information at the computing device 218 without user inputs to reduce delays and response times in the system 212. In at least one embodiment, the system 212 determines whether to provide automated validation, routing, response, or combinations thereof or to provide validation, routing, or response options to a remote user based at least partially on the sensor information. For example, the computing device 218 may determine that, based at least partially on the sensor information, the sensor information is best validated, routed, or responded to by a remote user, as an ML model or other computerized model may lack information or historical data to respond. In another example, the computing device 218 may determine that, based at least partially on the sensor information, the sensor information can be efficiently responded to automatically to save time and provide a notification or automated system control, such as in the event of a safety emergency.

In some embodiments, the plurality of sensors 214 may be located at a variety of locations of the wellsite 216 to measure and/or report a variety of sensor information to the computing device 218. For example, the wellsite 216 has at least one downhole sensor 214-1. The downhole sensor may measure one or more conditions of the downhole environment, such as downhole pressure or downhole temperature. In some examples, the wellsite 216 has at least one surface sensor 214-2. The surface sensor may measure at least one surface condition, including but not limited to environmental conditions, such as air temperature, air pressure, or humidity. In some examples, the wellsite 216 has at least one equipment sensor 214-3. For example, the equipment sensor 214-3 may measure or record one or more property of surface or downhole equipment, such as rotational velocity, translational velocity, orientation, motor speed, force, torque, etc. In some examples, the wellsite 216 has at least one fluid sensor 214-4. The fluid sensor may measure at least one property of the drilling fluid or a produced fluid, or of solids in solution or suspended therein. For example, the fluid sensor may measure flow rate, density, viscosity, total suspended solids, specific gravity, or other fluid properties. In at least one example, the fluid sensor may allow a chemical analysis of the fluid or other phases therein.

As described herein, some sensors may measure values for one or more operating conditions or properties, while other sensors may monitor an operating condition or property only for exceeded at preset threshold value. In such an example, the sensor information may include an alert that a threshold has been exceeded and lack nominal values. For example, the sensors may include third party sensors, measurements, or alerts over which the system 212 does not have direct control and/or communication with the device measuring the values of the operating condition.

The sensor information is transmitted to the computing device 218, in some embodiments, through a control plane 222, such as a core services control plane. In some embodiments, the control plane 222 can batch or otherwise associate sensor information. For example, the control plane 222 can batch sensor information to provide relevant information in context or to identify a particular event with correlated sensor information from different sensors. In some embodiments, the sensor information is batched at the control plane 222. In some embodiments, the sensor information is batched at the computing device 218.

In some embodiments, the sensor information is batched based at least partially on the sensor types and/or type of sensor information, such as temperature (or temperature sensors), pressure (or pressure sensors), acceleration (or acceleration sensors), velocity (or velocity sensors), viscosity (or viscosity sensor), equipment sensors, fluid sensors, etc. In some embodiments, the sensor information is batched based at least partially on the location of sensors. For example, the sensor information may be batched based sensor information originating from the downhole environment, the equipment, the surface environment, inside the drill string, the formation, etc. In some embodiments, the sensor information is batched based at least partially on a temporal range, such as all sensor information or subsets of sensor information received within a 30-second range around a particular event, a 1-minute range, a 5-minute range, a 10-minute range, a 30-minute range, a 1-hour range, a 24-hour range, etc. For example, the sensor information may be batched to include all accelerometer information, torque information, and drilling fluid properties from both the downhole environment and the surface environment within a 30-minute range around a stick-slip event. In some embodiments, the sensor information is provided to the computing device 218 as collected without batching, requests, or additional data handling by the control plane 222 or other component of the system 212.

As described herein, the computing device 218 may be a server, array of servers, cloud computing resources or other computing resources. The computing device 218 may have stored thereon or access to an ML model or other computerized model that assists in validating and/or responding to the sensor information or batch of sensor information. In some embodiments, the computing device 218 has stored thereon or access to one or more additional databases or relevant information about the wellsite 216 that provide additional input(s) to the ML model or other computerized model. For example, the computing device 218 may have stored thereon or access to a drilling plan 224 for a drill site, well information 226 for a producing wellsite, a drilling interpretation log 228, drilling rig hours 230, formation information 232 or other wellsite logs, or other information that provides additional context or data to the ML model or other computerized model.

The computing device 218 can allow a remote user, such as in the townsite 220, to have or to supplement remote control of the wellsite 216. For example, the computing device 218 is, in some embodiments, in data communication with a user interface (UI) 234 that allows a remote user to view at least a portion of the sensor information and/or interpretation of the sensor information from the computerized model of the computing device 218. The UI 234 further allows the remote user to provide user inputs to the UI to validate, route, or otherwise respond to the sensor information and/or interpretation of the sensor information.

For example, the UI 234 may provide to the remote user the sensor information and one or more of measurement-while-drilling (MWD) information 236, drilling interpretations 238, drilling models 240, fluid advisor information 242, and other additional information related to or derived from the sensor information. In some embodiments, the UI 234 allows the user to view the sensor information and/or the additional information concurrently with notification options 244 that allow the user to send notifications to validate the sensor information, a proposed alarm or control response, and route an alarm or control response to a notification destination 246 at the wellsite 216. In some embodiments, the notification is transmitted to the notification destination 246 directly from the computing device 218. In some embodiments, the notification is transmitted to the notification destination 246 through the control plane 222.

As described herein, the system 212 may receive user inputs from the remote user to validate, route, or respond to the sensor information from the plurality of sensors 214. In some embodiments, the computing device 218 receives the sensor information and, based on an ML model or other computerized model, validates, routes, or responds to the sensor information automatically without further user input.

Figures 1, 3:
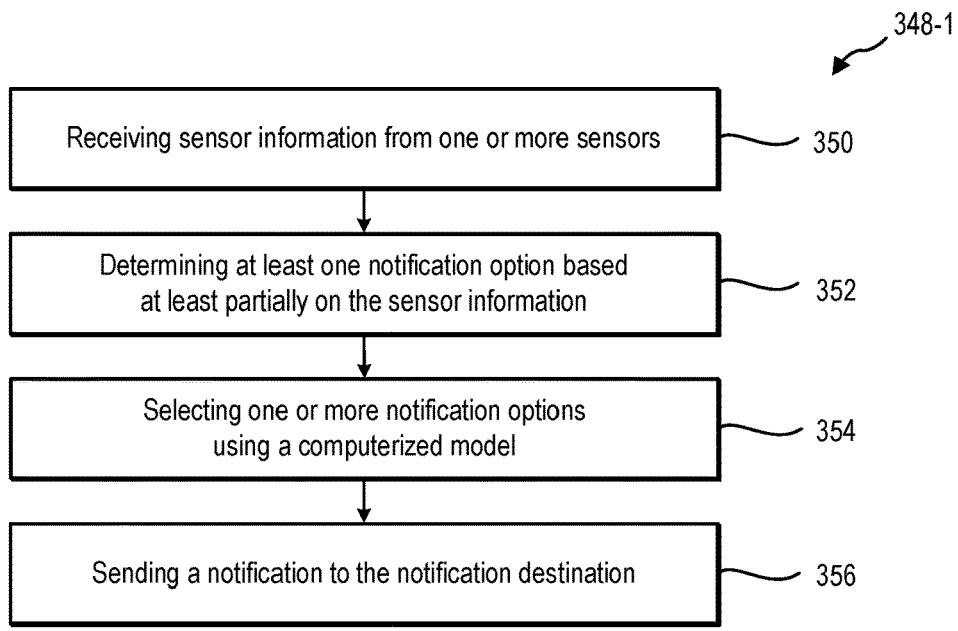
Figures 2, 3:
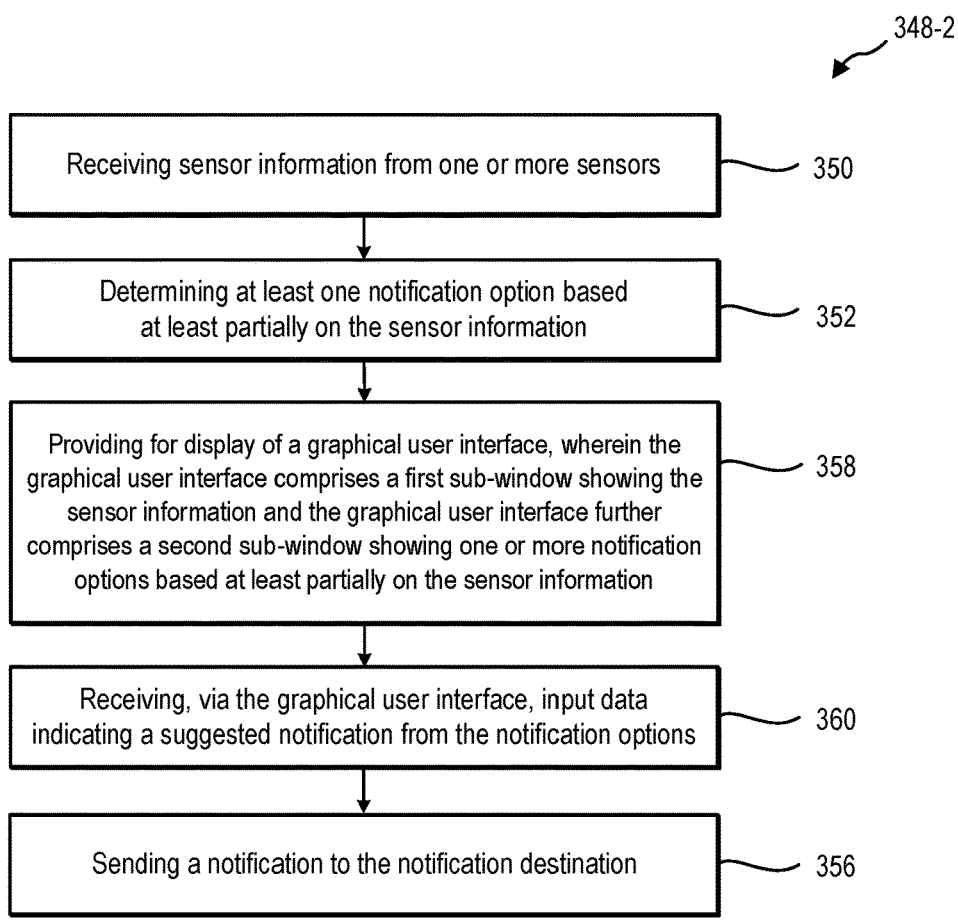

FIG. 3-1 is a flowchart illustrating a method 348-1 of wellsite control that uses an automated response. FIG. 3-2 is a flowchart illustrating a method 348-2 of wellsite control that includes receiving at least one user input. In some embodiments, the method 348-1 of wellsite control that uses an automated response includes receiving sensor information from one or more sensors at 350. In some embodiments, the sensor information includes surface sensor information. In some embodiments, the sensor information includes downhole sensor information. The sensor information may include information related to the source of the sensor information, such as a physical location of the sensor that reported at least a portion of the sensor information or a sensor type of the sensor that reported at least a portion of the sensor information. The sensor physical location and/or the sensor type may allow the sensor information to be batched or later queried. In at least one example, the sensor information includes data from a plurality of accelerometers at different physical locations along the drill string. Such sensors will each report a different physical location while reporting the same sensor type.

The sensor information can include any sensor information described herein, such as downhole sensor information, surface sensor information, fluid sensor information, equipment sensor information, other sensor information, or combinations thereof. For example, the sensor information may include at least one environment condition of the wellsite. In some examples, the sensor information includes at least one operating condition of the equipment of the wellsite. In some examples, the sensor information includes fluid information about a drilling fluid or a produced fluid at the wellsite.

The method 348-1 further includes determining at least one notification option based at least partially on the sensor information at 352. The computing device may input the sensor information into a computerized model (e.g., ML model) and determine at least one validation, routing, or response option to the sensor information. In some embodiments, additional information is obtained by the computing device as an input to the computerized model. For example, the sensor information may be input to the computerized model with a drill plan or formation information. In some embodiments, secondary sensor information is obtained by the computing device as an input to the computerized model. For example, the sensor information (e.g., primary sensor information) may be relayed to the computing device, and the computing device may request or access secondary sensor information from other sensors at or near the wellsite. In at least one example, the primary sensor information may be acceleration information from accelerometers on a drill string, and based at least partially on the primary sensor information, the computing device may request or access secondary sensor information, such as fluid sensor information. The primary sensor information and secondary sensor information may be input to the computerized model to determine at least one notification option.

In some embodiments, the notification option is a validation of an alarm or alert related to the sensor information, allowing the alarm or alert to be transmitted to a notification destination, such as an operator at the wellsite or a physical alarm that notifies an area or portion of the wellsite as to the sensor information. In some embodiments, the notification option is a routing of a notification related to the sensor information, wherein an output of the computerized model is one or more notification destinations, such as a particular operator at the wellsite or a particular physical alarm that notifies an area or portion of the wellsite as to the sensor information. For example, multiple operators may be responsible for different operations at the wellsite. A conventional alarm may notify all of the operators, while one or a subset of the operators is currently able to respond to the alarm. Notifying unnecessary operators can condition operators to ignore alarms. Additionally, notifying too many operators can result in each operator mistakenly believing a different operator is responding to the alarm. Routing the notification efficiently and precisely can improve response times and improve compliance with the notification.

In some embodiments, the notification option is a proposed response to the sensor information, where the response can be transmitted to a notification destination, such as an operator at the wellsite or a control system (such as a control plane) to change at least one operating parameter of the equipment at the wellsite. In some examples, the proposed response is sent to an operator local to the wellsite. The operator may then initiate the response or make a modification to the response. In some examples, the response is an equipment control command that is sent directly to one or more pieces of equipment at the wellsite implement the response and change at least one operating parameter. When the response is an established or proven response to the sensor information, a direct equipment control command can improve response times and efficiently control the equipment of the wellsite.

In some embodiments, the method 348-1 further includes selecting one or more notification options using the computerized model at 354 and sending a notification to a notification destination at 356. Selecting one or more notification options may include selecting the one notification option when only one notification option is determined. In other examples, selecting one or more notification options may include selecting all notification options when a plurality of notification options is determined. In yet other examples, selecting one or more notification options may include selecting a subset of the proposed notification options when a plurality of notification options is determined. In such an example, a first proposed notification option may render unnecessary a second notification option, such as a direct equipment control command rendering unnecessary validation and transmitting an alarm notification. In some examples, it may be desirable to send the alarm notification to an operator with an alert that an automated equipment control command has been sent to the equipment. In such an example, operator intervention may be unnecessary, but operator monitoring and awareness of the equipment and sensor measurement may be beneficial.

In some embodiments, sending the notification to a notification destination includes sending the notification from the computing device. In some embodiments, sending the notification to a notification destination includes sending the notification from or through a control plane in data communication with the computing device. For example, equipment control commands may be sent from the control plane, while alerts and notifications to operators may be sent from the computing device.

FIG. 3-2 is a flowchart of a method 348-2 of wellsite control with user input. Similar to as described in FIG. 3-1, the method 348-2 includes receiving sensor information from one or more sensors at 350. In some embodiments, the sensor information includes surface sensor information. In some embodiments, the sensor information includes downhole sensor information. The sensor information may include information related to the source of the sensor information, such as a physical location of the sensor that reported at least a portion of the sensor information or a sensor type of the sensor that reported at least a portion of the sensor information. The sensor physical location and/or the sensor type may allow the sensor information to be batched or later queried. In at least one example, the sensor information includes data from a plurality of accelerometers at different physical locations along the drill string. Such sensors will each report a different physical location while reporting the same sensor type.

The sensor information can include any sensor information described herein, such as downhole sensor information, surface sensor information, fluid sensor information, equipment sensor information, other sensor information, or combinations thereof. For example, the sensor information may include at least one environment condition of the wellsite. In some examples, the sensor information includes at least one operating condition of the equipment of the wellsite. In some examples, the sensor information includes fluid information about a drilling fluid or a produced fluid at the wellsite.

The method 348-2 further includes determining at least one notification option based at least partially on the sensor information at 352. The computing device may input the sensor information into a computerized model (e.g., ML model) and determine at least one validation, routing, or response option to the sensor information. In some embodiments, additional information is obtained by the computing device as an input to the computerized model. For example, the sensor information may be input to the computerized model with a drill plan or formation information. In some embodiments, secondary sensor information is obtained by the computing device as an input to the computerized model. For example, the sensor information (e.g., primary sensor information) may be relayed to the computing device, and the computing device may request or access secondary sensor information from other sensors at or near the wellsite. In at least one example, the primary sensor information may be acceleration information from accelerometers on a drill string, and based at least partially on the primary sensor information, the computing device may request or access secondary sensor information, such as fluid sensor information. The primary sensor information and secondary sensor information may be input to the computerized model to determine at least one notification option.

In some embodiments, the notification option is a validation of an alarm or alert related to the sensor information, allowing the alarm or alert to be transmitted to a notification destination, such as an operator at the wellsite or a physical alarm that notifies an area or portion of the wellsite as to the sensor information. In some embodiments, the notification option is a routing of a notification related to the sensor information, wherein an output of the computerized model is one or more notification destinations, such as a particular operator at the wellsite or a particular physical alarm that notifies an area or portion of the wellsite as to the sensor information. For example, multiple operators may be responsible for different operations at the wellsite. A conventional alarm may notify all of the operators, while one or a subset of the operators is currently able to respond to the alarm. Notifying unnecessary operators can condition operators to ignore alarms. Additionally, notifying too many operators can result in each operator mistakenly believing a different operator is responding to the alarm. Routing the notification efficiently and precisely can improve response times and improve compliance with the notification.

In some embodiments, the notification option is a proposed response to the sensor information, where the response can be transmitted to a notification destination, such as an operator at the wellsite or a control system (such as a control plane) to change at least one operating parameter of the equipment at the wellsite. In some examples, the proposed response is sent to an operator local to the wellsite. The operator may then initiate the response or make a modification to the response. In some examples, the response is an equipment control command that is sent directly to one or more pieces of equipment at the wellsite implement the response and change at least one operating parameter. When the response is an established or proven response to the sensor information, a direct equipment control command can improve response times and efficiently control the equipment of the wellsite.

In some embodiments, the method 348-2 includes providing a graphical UI for display to a user at 358. The graphical UI includes a first sub-window showing the sensor information and a second sub-window showing the one or more notification options determined by the computerized model. The graphical UI allows a remote user to evaluate the sensor information and select a suggested notification from the notification options at 360. In some embodiments, the user may request additional information via the graphical UI and the computing device before selecting a notification option. In some embodiments, the user may request secondary sensor information via the graphical UI and the computing device before selecting a notification option. In some embodiments, the user may decline all notification options and indicate the sensor information does not require a response or notification (e.g., a false alarm).

When the computing device receives, via the graphical UI, input data indicating a suggested notification from the notification options at 360, the method includes sending a notification to a notification destination at 356. In some embodiments, sending the notification to a notification destination includes sending the notification from the computing device. In some embodiments, sending the notification to a notification destination includes sending the notification from or through a control plane in data communication with the computing device. For example, equipment control commands may be sent from the control plane, while alerts and notifications to operators may be sent from the computing device.

Figure 4:
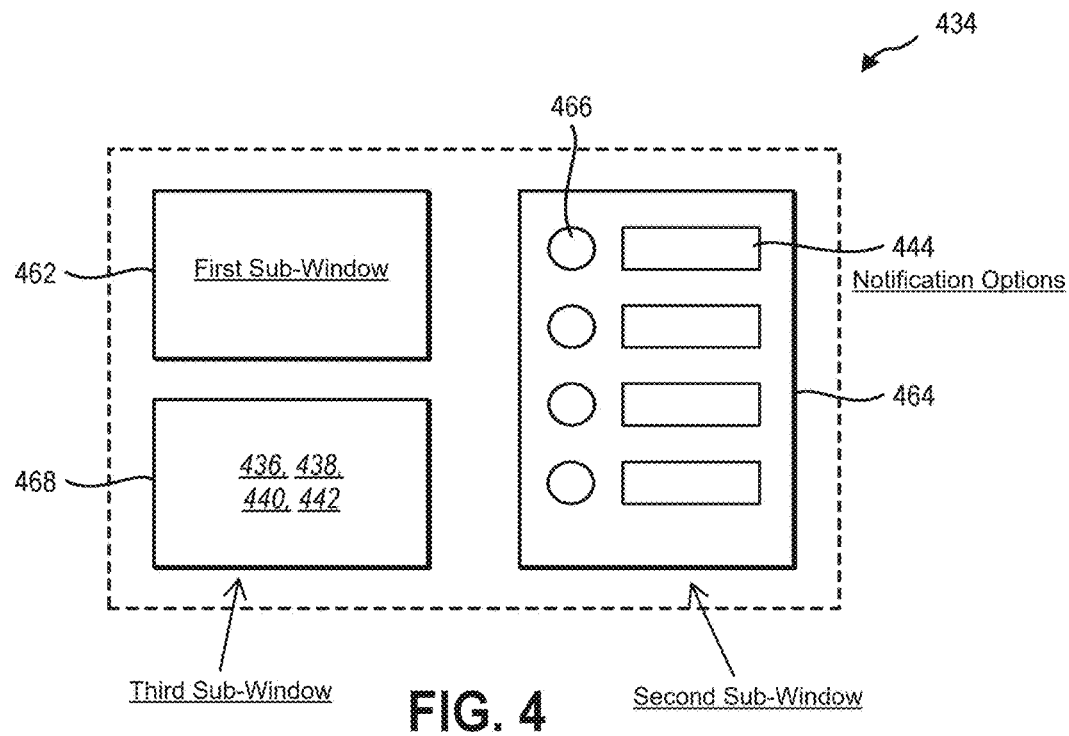
FIG. 4 is an embodiment of a user interface for wellsite control, according to some embodiments of the present disclosure.

FIG. 4 illustrates an embodiment of a graphical UI 434 that may be presented to a remote user. The graphical UI 434 includes at least a first sub-window 462 and a second sub-window 464 that present graphical information to the user. The first sub-window 462 presents at least a portion of the sensor information received at the computing device.

The second sub-window 464 presents one or more notification options 444 with a user input mechanism 466 that allows a user to indicate one or more of the notification options 444 for selection. In some embodiments, the graphical UI 434 allows the selection of a single notification option 444. In some embodiments, the graphical UI 434 allows the selection of a plurality of notification options 444. The graphical UI 434 can allow the simultaneous viewing of the notification options 444 in the second sub-window 464 and the sensor information in the first sub-window 462. The user can review the suggested notification options 444 in context of the sensor information to make an informed decision based on the sensor information.

In some embodiments, additional information, such as MWD information 436, drilling interpretations 438, drilling models 440, fluid advisor information 442, and other additional information related to or derived from the sensor information can be displayed to the user in the graphical UI 434 to further inform the user. In some embodiments, the additional information is displayed within the first sub-window 462 with the sensor information. In some embodiments, the additional information is displayed within a third sub-window 468 of the graphical UI 434.

Figure 5:
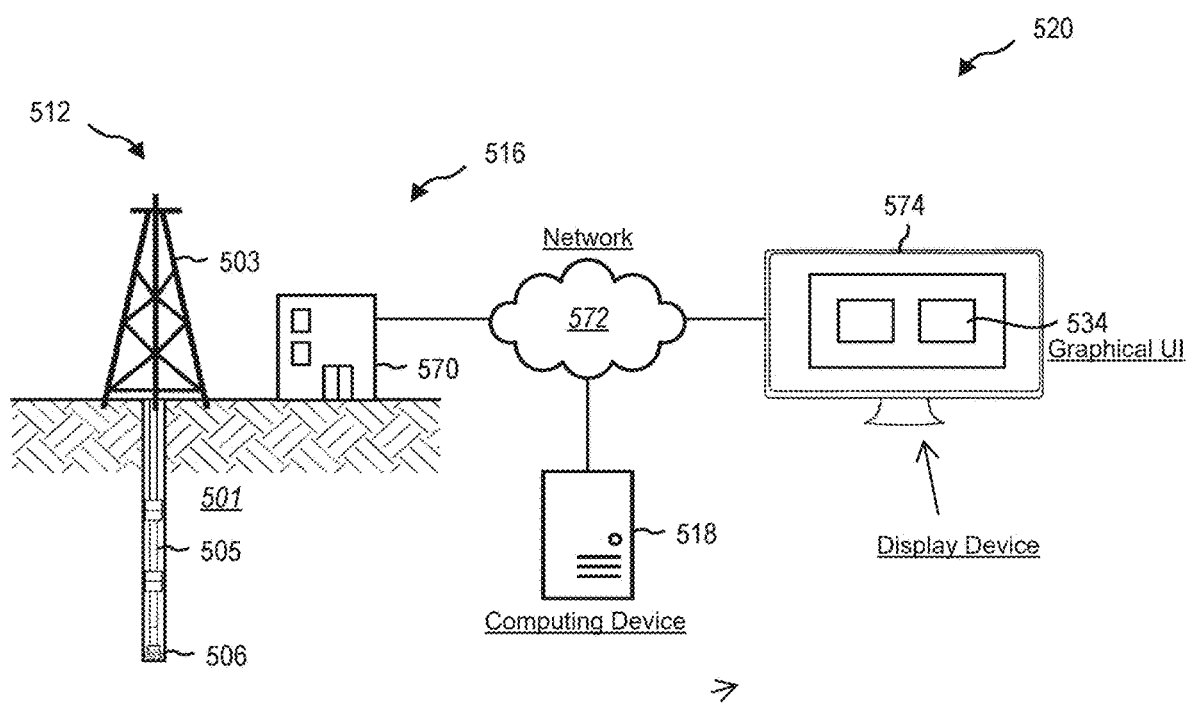
FIG. 5 is a schematic representation of communication within a system for wellsite control, according to some embodiments of the present disclosure.

The graphical UI 434 can allow a remote user to provide instructions to the computing device, control plane, or other components of the system to notify operators at the wellsite or control equipment at the wellsite while having greater computational resources than are available at the wellsite. FIG. 5 is a schematic representation of an embodiment of a system 512 for wellsite control. The system 512 includes a drill rig 503 and drill string 505 with a BHA 506 connected thereto. In the illustrated example, a control cabin 570 is located at the wellsite 516 to control the drill rig 503. The control cabin 570 is in data communication with the equipment of the drill rig 503, the drill string 505, and the BHA 506. In some embodiments, the control cabin 570 includes or houses a control plane.

In some embodiments, the control cabin 570 is in data communication with one or more sensors of the plurality of sensors located proximate the control cabin 570 (or otherwise at the surface), the drill rig 503, the drill string 505, the BHA 506, a formation 501, or other locations at the wellsite 516. The sensor information is provided to a network 572 in communication with the sensors, equipment, and/or control cabin 570. In some embodiments, the network 572 provides data communication with a computing device 518 and a townsite 520. In some embodiments, the network 572 provides data communication with a townsite 520 in which the computing device 518 is located. A display device 574 located in the townsite 520 may display a graphical UI 534 provided by the computing device 518. Notifications from the computing device 518 and/or townsite 520 may be provided to the control plane, the control cabin 570, the equipment, or other components of the wellsite 516 as well as operators located at or in communication with the wellsite 516. In some embodiments, an operator located at or in communication with the wellsite that receives the notification sent by the computing device 518 and/or townsite 520 can review and respond to the notification. The operator's response to the notification is, in some embodiments, recorded to the computerized model (e.g., ML model) and used to further refine the accuracy and precision of the notification options and/or selected notification or action within the computerized model.

Figure 6:
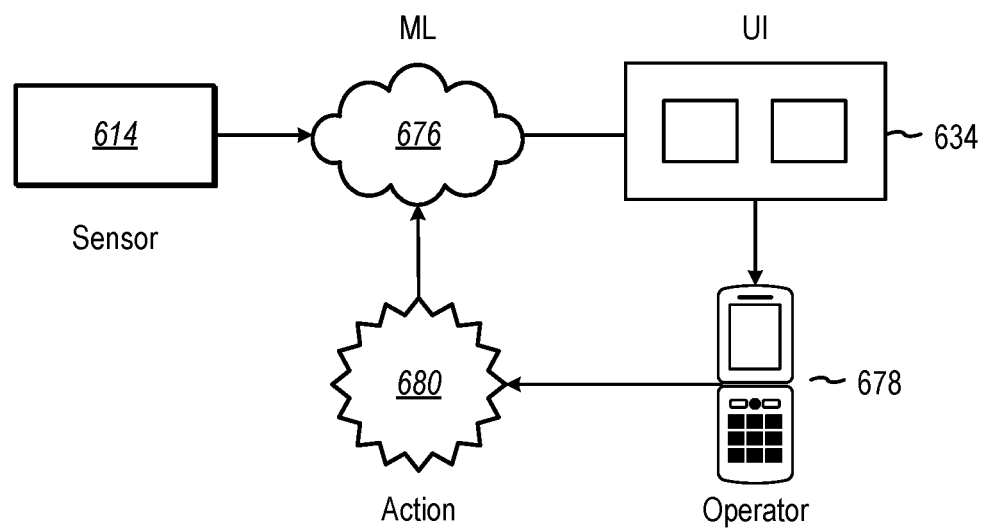
FIG. 6 is a flowchart illustrating directions of communication within a system for wellsite control, according to some embodiments of the present disclosure.

FIG. 6 is a flowchart illustrating the capture of the selected notifications and/or actions taken by an operator into an embodiment of an ML model 676. In some embodiments, a system for wellsite control includes one or more sensors 614 in communication with a computerized model, such as the illustrated ML model 676. The ML model 676 receives the sensor information and, based on prior training datasets, determines one or more notification options in response to the sensor information (and optionally, additional information). In some embodiments, a remote user selects a notification option from the proposed notifications options via a graphical UI 634, and the selected notification option is sent to an operator 678 at or in communication with the wellsite. In such examples, the operator 678 may provide to the remote user and/or the ML model 676 a confirmation or take an action 680 based at least partially on the notification. In some embodiments, the confirmation is transmitted to and recorded by the ML model 676 to further train the ML model 676 as to the veracity of the notification. The action 680 taken and/or the result thereof is transmitted to the ML model 676 to further train the ML model 676 as to the action 680 taken and the results of the action 680. The ML model 676 may further correlate the action 680 and/or results with the selected notification sent to the operator 678 to further determine the effectiveness of the notification, as well as the action 680.

The ML model 676 may receive the confirmation of the notification and/or of the action 680 to confirm the veracity of the notification selected by the remote user in the UI 634. In some embodiments, the notification sent based on the user input to the UI 634 includes a user identification (ID) that allows the notification destination to know or track the source of the user inputs. For example, different user IDs may exhibit different behaviors for which the ML model 676 can account. In other examples, a wellsite operator 678 may contact the remote user based on the user ID to gain further information related to the notification. In some embodiments, the requested further information can be recorded by the ML model 676 to further train the ML model to include such further information in future notifications.

Figure 7:
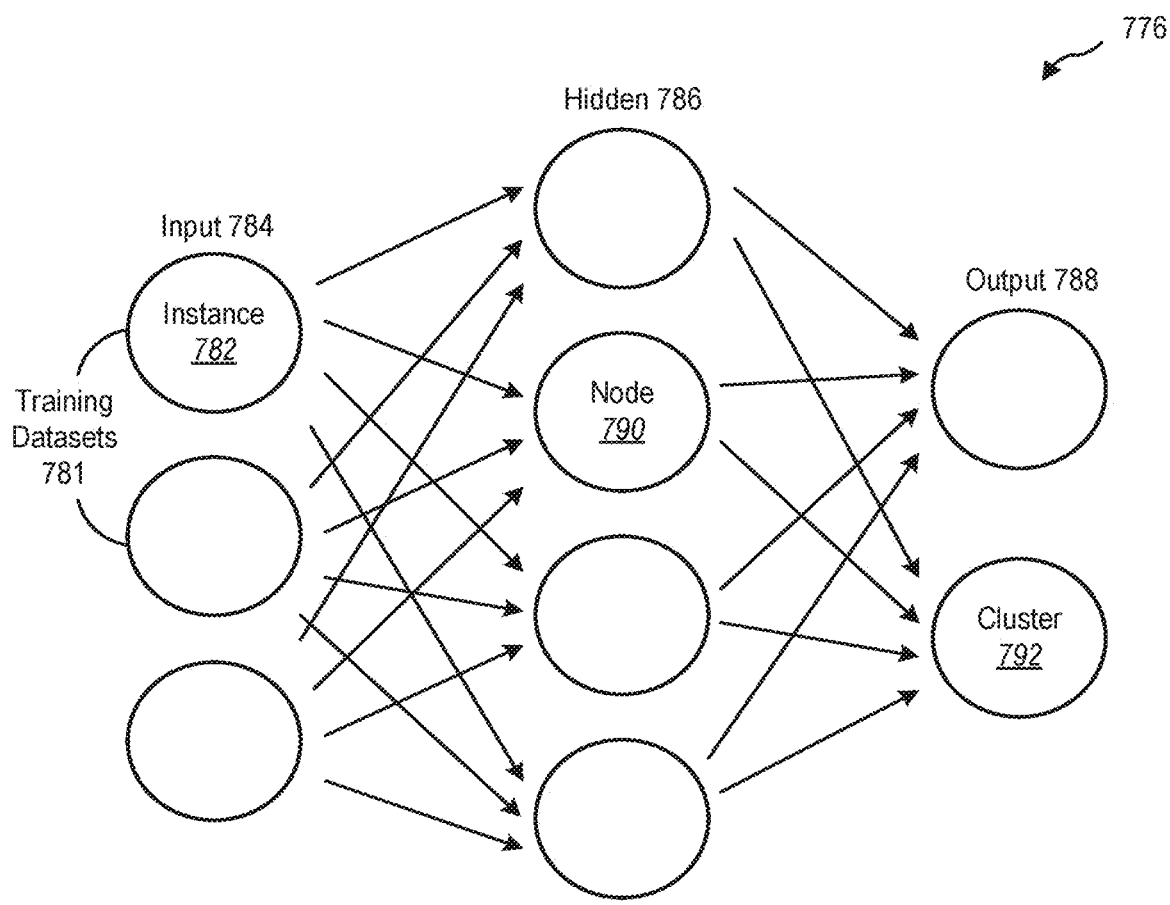
FIG. 7 is a diagram of a machine learning model, according to some embodiments of the present disclosure.

In some embodiments, determining and/or selecting a notification option (such as described in relation to FIG. 2) is at least partially determined by an ML model or system. FIG. 7 is a schematic representation of an ML model 776 that may be used with one or more embodiments of systems and methods described herein. As used herein, a "machine learning model" refers to a computer algorithm or model (e.g., a classification model, a regression model, a language model, an object detection model) that can be tuned (e.g., trained) based on training input to approximate unknown functions. For example, an ML model may refer to a neural network or other ML algorithm or architecture that learns and approximates complex functions and generate outputs based on a plurality of inputs provided to the ML model. In some embodiments, an ML system, model, or neural network described herein is an artificial neural network. In some embodiments, an ML system, model, or neural network described herein is a convolutional neural network. In some embodiments, an ML system, model, or neural network described herein is a recurrent neural network. In at least one embodiment, an ML system, model, or neural network described herein is a Bayes classifier. As used herein, a "machine learning system" may refer to one or multiple ML models that cooperatively generate one or more outputs based on corresponding inputs. For example, an ML system may refer to any system architecture having multiple discrete ML components that consider different kinds of information or inputs.

As used herein, an "instance" refers to an input object that may be provided as an input to an ML system to use in generating an output, such as a model, components, sub-components, and properties or values thereof. For example, an instance may refer to any control or response event at a wellsite. For example, an control or response event may include sensor information prior to or during an event that resulted in a notification being provided to an operator or an equipment control command being provided to a piece of equipment. In some examples, the instance includes results of the notification being provided to an operator or an equipment control command being provided to a piece of equipment. For example, the selected notification option selected by a user and/or the action 680 taken by an operator, described in relation to FIG. 6, may be considered instances or portions of instances.

In some embodiments, the ML system has a plurality of layers with an input layer 784 configured to receive at least one input training dataset 781 or input training instance 782 and an output layer 788, with a plurality of additional or hidden layers 786 therebetween. In some embodiments, the ML system can receive multiple training datasets concurrently and learn from the different training datasets simultaneously.

In some embodiments, the ML system includes a plurality of ML models that operate together. Each of the ML models has a plurality of hidden layers between the input layer and the output layer. The hidden layers have a plurality of input nodes (e.g., nodes 790), where each of the nodes operates on the received inputs from the previous layer. In a specific example, a first hidden layer has a plurality of nodes and each of the nodes performs an operation on each instance from the input layer. Each node of the first hidden layer provides a new input into each node of the second hidden layer, which, in turn, performs a new operation on each of those inputs. The nodes of the second hidden layer then passes outputs, such as identified clusters 792, to the output layer 788.

In some embodiments, each of the nodes 790 has a linear function and an activation function. The linear function may attempt to optimize or approximate a solution with a line of best fit. The activation function operates as a test to check the validity of the linear function. In some embodiments, the activation function produces a binary output that determines whether the output of the linear function is passed to the next layer of the ML model. In this way, the ML system can limit and/or prevent the propagation of poor fits to the data and/or non-convergent solutions.

The ML model includes an input layer that receives at least one training dataset. In some embodiments, at least one ML model uses supervised training. In some embodiments, at least one ML model uses unsupervised training. Unsupervised training can be used to draw inferences and find patterns or associations from the training dataset(s) without known outputs. In some embodiments, unsupervised learning can identify clusters of similar labels or characteristics for a variety of training instances and allow the ML system to extrapolate the designations of instances with similar characteristics.

In some embodiments, semi-supervised learning can combine benefits from supervised learning and unsupervised learning. As described herein, the ML system can identify associated labels or characteristic between instances, which may allow a training dataset with known outputs and a second training dataset including more general input information to be fused. Unsupervised training can allow the ML system to cluster the instances from the second training dataset without known outputs and associate the clusters with known outputs from the first training dataset. The ML model may, thereby, train itself using incomplete instances or via a variety of disparate instances.

Figure 8:
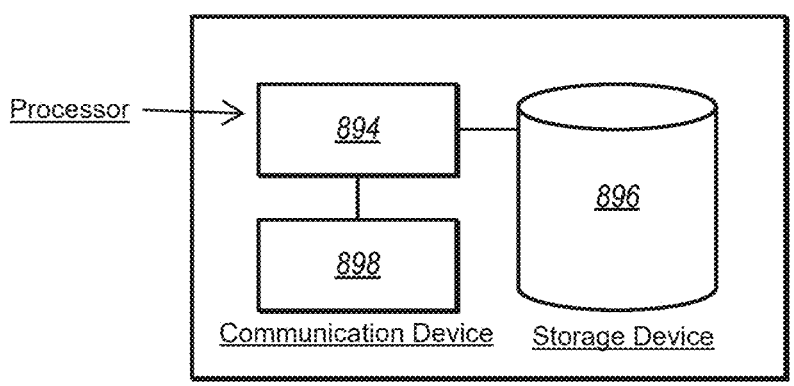
FIG. 8 is a schematic diagram of a computing device, according to some embodiments of the present disclosure.

FIG. 8 is an embodiment of a computing device 814 configured to communicate with wellsite sensors, such as described in relation to FIG. 2-6. The computing device 814 includes a processor 894 and a hardware storage device 896. The hardware storage device 896 can be any non-transient computer readable medium that may store instructions thereon. The hardware storage device 896 may be any type of solid-state memory; volatile memory, such as static random access memory (SRAM) or dynamic random access memory (DRAM); non-volatile memory, such as read-only memory (ROM) including programmable ROM (PROM), erasable PROM (EPROM) or EEPROM; magnetic storage media, such as magnetic tape; a platen-based storage device, such as hard disk drives; optical media, such as compact discs (CD), digital video discs (DVD), Blu-ray Discs, or other optical media; removable media such as USB drives; non-removable media such as internal SATA or non-volatile memory express (NVMe) style NAND flash memory; or any other non-transient storage media. The hardware storage device 896 includes instructions stored thereon that, when executed by the processor 894, cause the computing device 814 to perform any method or part of a method described herein.

The computing device 814, further includes a communication device 898, such as a wireless or wired communication device, that allows transmission and receipt of data between the computing device 814 and external computing devices, sensors, or other electronic devices.

INDUSTRIAL APPLICABILITY

Embodiments of the present disclosure generally relate to devices, systems, and methods for wellsite controls. It should be understood that while the present disclosure will describe the communication of alerts and notifications to and from a wellsite, a wellsite may be a drilling site for the future production of fluids, a producing well that is managed during production, or a wellsite that is managed after fluids are not actively extracted. The systems and method described herein may be used for wellsite controls at any stage of the creation, operational lifetime, or remediation of the wellbore.

In some embodiments, systems and methods for wellsite control include one or more sensors located at, in, or near the wellsite that are in data communication with a computing device. The computing device is in data communication with a recommendation module that allows the computing device to interpret and/or process the incoming sensor information. The computing device can then provide a notification to one or more operators, users, or locations based on the sensor information. By notifying operators, users, or locations of the wellsite more accurately than conventional alarm systems, the systems and methods according to the present disclosure can allow for more accurate and precise responses to wellsite conditions in a shorter time.

More particularly, system and methods for wellsite control according to the present disclosure utilize remote resources, both human and computational, to provide improvements to notification validation, routing, and response. In some embodiments, remote personnel provide validation, routing, and response to the information provided from the wellsite. In some embodiments, a machine learning (ML) model or other computerized model provides validation, routing, and response to the information provided from the wellsite. In some embodiments, the validation, routing, and response is at least partially automated such that one or more users are removed from a conventional communication channel to reduce response delays or durations.

In some embodiments, one or more sensors at a wellsite provide measurements, alerts, or other sensor information to an intermediate server. The server can analyze the sensor information and provide validation, routing, response, or combinations thereof of the sensor information to a user or equipment at the wellsite. In some embodiments, the validation, routing, response, or combinations thereof are based on historic models or recorded prior validation, routing, or responses. In some embodiments, the server relays the sensor information (and, optionally, additional information) to a remote user, such as in a town site remote from the wellsite, for validation, routing, response, or combinations thereof. For example, the remote user may receive or obtain additional information to supplement a decision regarding the sensor information prior to validating, routing, or otherwise responding to the sensor information. The additional information may include environmental information (such as weather), formation information (such as seismic information or historic fluid production information), drill plan information, secondary sensor information from other sensors at the wellsite, or outputs from computational models performed using any combination of the sensory information and additional information that are computationally intensive and are unable or impractical to be performed at the wellsite. In at least one example, a system or method of the present disclosure can leverage cloud computing resources to determine a particular validation, routing, response, or combination thereof to provided sensor information.

In some embodiments, a receiving user of the notification and/or response at the wellsite can provide feedback to the remote user at the townsite and/or to the computer system that allows recording of the feedback to the ML model or other computerized model of the computing device. The feedback can be captured, recorded, or integrated in the computerized model as a future recommendation for validation, routing, response, or combinations thereof, as an input to the computerized model for recursive models, or as a new or modified middle node in an ML model. The refinement of the automated response or automated suggestions for response in the wellsite controls can improve safety, performance, and efficiency of the wellsite systems.

As described herein, the wellsite may be a drill site, a producing wellsite, or a non-producing wellsite, although a drill rig will be described herein. In some embodiments, a drilling system includes a drill rig used to turn a drilling assembly which extends downward into the wellbore. The drilling assembly may include a drill string and a bottomhole assembly (BHA) attached to the downhole end of drill string. Where the drilling system is used for drilling formation, a drill bit can be included at the downhole end of the BHA.

The drill string may include several joints of drill pipe a connected end-to-end through tool joints. The drill string transmits drilling fluid through a central bore and can transmit rotational power from the drill rig to the BHA. In some embodiments, the drill string may further include additional components such as subs, pup joints, etc. The drill pipe provides a hydraulic passage through which drilling fluid is pumped from the surface. The drilling fluid discharges through selected-size nozzles, jets, or other orifices in the bit for the purposes of cooling the bit and cutting structures thereon, for lifting cuttings out of the wellbore as it is being drilled, and for preventing the collapse of the wellbore. The drilling fluid carries drill solids including drill fines, drill cuttings, and other swarf from the wellbore to the surface. The drill solids can include components from the earth formation, the drilling assembly itself, from other man-made components (e.g., plugs, lost tools/components, etc.), or combinations thereof.

The BHA may include the bit or other components. An example BHA may include additional or other components (e.g., coupled between to the drill string and/or the bit). Examples of additional BHA components include drill collars, stabilizers, measurement-while-drilling (MWD) tools, logging-while-drilling (LWD) tools, downhole motors, underreamers, directional steering tools, section mills, hydraulic disconnects, jars, vibration or dampening tools, other components, or combinations of the foregoing.

In general, the drilling system may include other drilling components and accessories, such as special valves (e.g., kelly cocks, blowout preventers, safety valves, centrifuges, shaker tables, and rheometers). Additional components included in the drilling system may be considered a part of the surface system (e.g., drill rig, drilling assembly, drill string, or a part of the BHA, depending on their locations and/or use in the drilling system).

The bit in the BHA may be any type of bit suitable for degrading downhole materials. For instance, the bit may be a drill bit suitable for drilling the earth formation. Example types of drill bits used for drilling earth formations are fixed-cutter or drag bits, roller cone bits, impregnated bits, or coring bits. In other embodiments, the bit may be a mill used for removing metal, composite, elastomer, other materials downhole, or combinations thereof. For instance, the bit may be used with a whipstock to mill into casing lining the wellbore. The bit may also be a junk mill used to mill away tools, plugs, cement, other materials within the wellbore, or combinations thereof. Swarf or other cuttings formed by use of a mill may be lifted to surface by the drilling fluid or may be allowed to fall downhole. The conditions of the equipment of the drilling system, the formation, the wellbore, the drilling fluid, or other part of the wellsite can change during operations. Sensors within the wellsite provide information to make operation decisions for efficiency, safety, and other reasons.

In some embodiments, a wellsite includes a plurality of sensors at the surface, in the wellbore (e.g., the downhole environment), in the formation, on or in equipment (such as any equipment described herein), or elsewhere that provide sensor information to a controller or a computing device. In some embodiments, the controller or computing device is located in a control building at the wellsite. In some embodiments, the controller or computing device is located remotely from the wellsite, such as a remote server or computing device at a townsite. The sensor information may include measurements of operating parameters, measurements of environmental conditions, or alerts that an operating parameter or environmental condition is outside of or has exceeded set thresholds. For example, a sensor information may be a weight-on-bit (WOB) measurement that provides the controller or computing device with a nominal measured value for the WOB during drilling. The sensor information may be a downhole fluid pressure measurement, such as a nominal pressure value during fluid production of a wellsite. In some examples, the sensor information may be an alert that vibration in the BHA has exceeded a safety threshold and the sensor information may or may not include the nominal shock and/or vibration value (such as a rotational acceleration value) with the alert based on exceeding the preset safety threshold.

In some embodiments, a system for wellsite control includes a plurality of sensors located proximate the wellsite and a computing device located remotely from the wellsite, such as in a townsite. In some embodiments, the computing device is a server or a cloud computing device that is located remotely from both the wellsite and the townsite. In some embodiments, the system includes additional displays and/or input devices in the townsite to allow a remote user in the townsite to provide validation, routing, response, or combinations thereof to the wellsite. In some embodiments, the system can analyze and provide validation, routing, response, or combinations thereof to sensor information at the computing device without user inputs to reduce delays and response times in the system. In at least one embodiment, the system determines whether to provide automated validation, routing, response, or combinations thereof or to provide validation, routing, or response options to a remote user based at least partially on the sensor information. For example, the computing device may determine that, based at least partially on the sensor information, the sensor information is best validated, routed, or responded to by a remote user, as an ML model or other computerized model may lack information or historical data to respond. In another example, the computing device may determine that, based at least partially on the sensor information, the sensor information can be efficiently responded to automatically to save time and provide a notification or automated system control, such as in the event of a safety emergency.

In some embodiments, the plurality of sensors may be located at a variety of locations of the wellsite to measure and/or report a variety of sensor information to the computing device. For example, the wellsite has at least one downhole sensor. The downhole sensor may measure one or more conditions of the downhole environment, such as downhole pressure or downhole temperature. In some examples, the wellsite has at least one surface sensor. The surface sensor may measure at least one surface condition, including but not limited to environmental conditions, such as air temperature, air pressure, or humidity. In some examples, the wellsite has at least one equipment sensor. In some examples, the wellsite has at least one fluid sensor. The fluid sensor may measure at least one property of the drilling fluid or a produced fluid, or of solids in solution or suspended therein. For example, the fluid sensor may measure flow rate, density, viscosity, total suspended solids, specific gravity, or other fluid properties. In at least one example, the fluid sensor may allow a chemical analysis of the fluid or other phases therein.

As described herein, some sensors may measure values for one or more operating conditions or properties, while other sensors may monitor an operating condition or property only for exceeded at preset threshold value. In such an example, the sensor information may include an alert that a threshold has been exceeded and lack nominal values. For example, the sensors may include third party sensors, measurements, or alerts over which the system does not have direct control and/or communication with the device measuring the values of the operating condition.

The sensor information is transmitted to the computing device, in some embodiments, through a control plane, such as a core services control plane. In some embodiments, the control plane can batch or otherwise associate sensor information. For example, the control plane can batch sensor information to provide relevant information in context or to identify a particular event with correlated sensor information from different sensors. In some embodiments, the sensor information is batched at the control plane. In some embodiments, the sensor information is batched at the computing device.

In some embodiments, the sensor information is batched based at least partially on the sensor types and/or type of sensor information, such as temperature (or temperature sensors), pressure (or pressure sensors), acceleration (or acceleration sensors), velocity (or velocity sensors), viscosity (or viscosity sensor), equipment sensors, fluid sensors, etc. In some embodiments, the sensor information is batched based at least partially on the location of sensors. For example, the sensor information may be batched based sensor information originating from the downhole environment, the equipment, the surface environment, inside the drill string, the formation, etc. In some embodiments, the sensor information is batched based at least partially on a temporal range, such as all sensor information or subsets of sensor information received within a 30-second range around a particular event, a 1-minute range, a 5-minute range, a 10-minute range, a 30-minute range, a 1-hour range, a 24-hour range, etc. For example, the sensor information may be batched to include all accelerometer information, torque information, and drilling fluid properties from both the downhole environment and the surface environment within a 30-minute range around a stick-slip event. In some embodiments, the sensor information is provided to the computing device as collected without batching, requests, or additional data handling by the control plane or other component of the system.

As described herein, the computing device may be a server, array of servers, cloud computing resources or other computing resources. The computing device may have stored thereon or access to an ML model or other computerized model that assists in validating and/or responding to the sensor information or batch of sensor information. In some embodiments, the computing device has stored thereon or access to one or more additional databases or relevant information about the wellsite that provide additional input(s) to the ML model or other computerized model. For example, the computing device may have stored thereon or access to a drilling plan for a drill site, well information for a producing wellsite, a drilling interpretation log, drilling rig hours, formation information or other wellsite logs, or other information that provides additional context or data to the ML model or other computerized model.

The computing device can allow a remote user, such as in the townsite, to have or to supplement remote control of the wellsite. For example, the computing device is, in some embodiments, in data communication with a user interface (UI) that allows a remote user to view at least a portion of the sensor information and/or interpretation of the sensor information from the computerized model of the computing device. The UI further allows the remote user to provide user inputs to the UI to validate, route, or otherwise respond to the sensor information and/or interpretation of the sensor information.

For example, the UI may provide to the remote user the sensor information and one or more of measurement-while-drilling (MWD) information, drilling interpretations, drilling models, fluid advisor information, and other additional information related to or derived from the sensor information. In some embodiments, the UI allows the user to view the sensor information and/or the additional information concurrently with notification options that allow the user to send notifications to validate the sensor information, a proposed alarm or control response, and route an alarm or control response to a notification destination at the wellsite. In some embodiments, the notification is transmitted to the notification destination directly from the computing device. In some embodiments, the notification is transmitted to the notification destination through the control plane.

As described herein, the system may receive user inputs from the remote user to validate, route, or respond to the sensor information from the plurality of sensors. In some embodiments, the computing device receives the sensor information and, based on an ML model or other computerized model, validates, routes, or responds to the sensor information automatically without further user input.

In some embodiments, a method of wellsite control that uses an automated response includes receiving sensor information from one or more sensors. In some embodiments, the sensor information includes surface sensor information. In some embodiments, the sensor information includes downhole sensor information. The sensor information may include information related to the source of the sensor information, such as a physical location of the sensor that reported at least a portion of the sensor information or a sensor type of the sensor that reported at least a portion of the sensor information. The sensor physical location and/or the sensor type may allow the sensor information to be batched or later queried. In at least one example, the sensor information includes data from a plurality of accelerometers at different physical locations along the drill string. Such sensors will each report a different physical location while reporting the same sensor type.

The sensor information can include any sensor information described herein, such as downhole sensor information, surface sensor information, fluid sensor information, equipment sensor information, other sensor information, or combinations thereof. For example, the sensor information may include at least one environment condition of the wellsite. In some examples, the sensor information includes at least one operating condition of the equipment of the wellsite. In some examples, the sensor information includes fluid information about a drilling fluid or a produced fluid at the wellsite.

The method further includes determining at least one notification option based at least partially on the sensor information. The computing device may input the sensor information into a computerized model (e.g., ML model) and determine at least one validation, routing, or response option to the sensor information. In some embodiments, additional information is obtained by the computing device as an input to the computerized model. For example, the sensor information may be input to the computerized model with a drill plan or formation information. In some embodiments, secondary sensor information is obtained by the computing device as an input to the computerized model. For example, the sensor information (e.g., primary sensor information) may be relayed to the computing device, and the computing device may request or access secondary sensor information from other sensors at or near the wellsite. In at least one example, the primary sensor information may be acceleration information from accelerometers on a drill string, and based at least partially on the primary sensor information, the computing device may request or access secondary sensor information, such as fluid sensor information. The primary sensor information and secondary sensor information may be input to the computerized model to determine at least one notification option.

In some embodiments, the notification option is a validation of an alarm or alert related to the sensor information, allowing the alarm or alert to be transmitted to a notification destination, such as an operator at the wellsite or a physical alarm that notifies an area or portion of the wellsite as to the sensor information. In some embodiments, the notification option is a routing of a notification related to the sensor information, wherein an output of the computerized model is one or more notification destinations, such as a particular operator at the wellsite or a particular physical alarm that notifies an area or portion of the wellsite as to the sensor information. For example, multiple operators may be responsible for different operations at the wellsite. A conventional alarm may notify all of the operators, while one or a subset of the operators is currently able to respond to the alarm. Notifying unnecessary operators can condition operators to ignore alarms. Additionally, notifying too many operators can result in each operator mistakenly believing a different operator is responding to the alarm. Routing the notification efficiently and precisely can improve response times and improve compliance with the notification.

In some embodiments, the notification option is a proposed response to the sensor information, where the response can be transmitted to a notification destination, such as an operator at the wellsite or a control system (such as a control plane) to change at least one operating parameter of the equipment at the wellsite. In some examples, the proposed response is sent to an operator local to the wellsite. The operator may then initiate the response or make a modification to the response. In some examples, the response is an equipment control command that is sent directly to one or more pieces of equipment at the wellsite implement the response and change at least one operating parameter. When the response is an established or proven response to the sensor information, a direct equipment control command can improve response times and efficiently control the equipment of the wellsite.

In some embodiments, the method further includes selecting one or more notification options using the computerized model and sending a notification to a notification destination. Selecting one or more notification options may include selecting the one notification option when only one notification option is determined. In other examples, selecting one or more notification options may include selecting all notification options when a plurality of notification options is determined. In yet other examples, selecting one or more notification options may include selecting a subset of the proposed notification options when a plurality of notification options is determined. In such an example, a first proposed notification option may render unnecessary a second notification option, such as a direct equipment control command rendering unnecessary validation and transmitting an alarm notification. In some examples, it may be desirable to send the alarm notification to an operator with an alert that an automated equipment control command has been sent to the equipment. In such an example, operator intervention may be unnecessary, but operator monitoring and awareness of the equipment and sensor measurement may be beneficial.

In some embodiments, sending the notification to a notification destination includes sending the notification from the computing device. In some embodiments, sending the notification to a notification destination includes sending the notification from or through a control plane in data communication with the computing device. For example, equipment control commands may be sent from the control plane, while alerts and notifications to operators may be sent from the computing device.

Similar to as described above, a method of wellsite control with user input includes receiving sensor information from one or more sensors. In some embodiments, the sensor information includes surface sensor information. In some embodiments, the sensor information includes downhole sensor information. The sensor information may include information related to the source of the sensor information, such as a physical location of the sensor that reported at least a portion of the sensor information or a sensor type of the sensor that reported at least a portion of the sensor information. The sensor physical location and/or the sensor type may allow the sensor information to be batched or later queried. In at least one example, the sensor information includes data from a plurality of accelerometers at different physical locations along the drill string. Such sensors will each report a different physical location while reporting the same sensor type.

The sensor information can include any sensor information described herein, such as downhole sensor information, surface sensor information, fluid sensor information, equipment sensor information, other sensor information, or combinations thereof. For example, the sensor information may include at least one environment condition of the wellsite. In some examples, the sensor information includes at least one operating condition of the equipment of the wellsite. In some examples, the sensor information includes fluid information about a drilling fluid or a produced fluid at the wellsite.

The method further includes determining at least one notification option based at least partially on the sensor information. The computing device may input the sensor information into a computerized model (e.g., ML model) and determine at least one validation, routing, or response option to the sensor information. In some embodiments, additional information is obtained by the computing device as an input to the computerized model. For example, the sensor information may be input to the computerized model with a drill plan or formation information. In some embodiments, secondary sensor information is obtained by the computing device as an input to the computerized model. For example, the sensor information (e.g., primary sensor information) may be relayed to the computing device, and the computing device may request or access secondary sensor information from other sensors at or near the wellsite. In at least one example, the primary sensor information may be acceleration information from accelerometers on a drill string, and based at least partially on the primary sensor information, the computing device may request or access secondary sensor information, such as fluid sensor information. The primary sensor information and secondary sensor information may be input to the computerized model to determine at least one notification option.

In some embodiments, the notification option is a validation of an alarm or alert related to the sensor information, allowing the alarm or alert to be transmitted to a notification destination, such as an operator at the wellsite or a physical alarm that notifies an area or portion of the wellsite as to the sensor information. In some embodiments, the notification option is a routing of a notification related to the sensor information, wherein an output of the computerized model is one or more notification destinations, such as a particular operator at the wellsite or a particular physical alarm that notifies an area or portion of the wellsite as to the sensor information. For example, multiple operators may be responsible for different operations at the wellsite. A conventional alarm may notify all of the operators, while one or a subset of the operators is currently able to respond to the alarm. Notifying unnecessary operators can condition operators to ignore alarms. Additionally, notifying too many operators can result in each operator mistakenly believing a different operator is responding to the alarm. Routing the notification efficiently and precisely can improve response times and improve compliance with the notification.

In some embodiments, the notification option is a proposed response to the sensor information, where the response can be transmitted to a notification destination, such as an operator at the wellsite or a control system (such as a control plane) to change at least one operating parameter of the equipment at the wellsite. In some examples, the proposed response is sent to an operator local to the wellsite. The operator may then initiate the response or make a modification to the response. In some examples, the response is an equipment control command that is sent directly to one or more pieces of equipment at the wellsite implement the response and change at least one operating parameter. When the response is an established or proven response to the sensor information, a direct equipment control command can improve response times and efficiently control the equipment of the wellsite.

In some embodiments, the method includes providing a graphical UI for display to a user. The graphical UI includes a first sub-window showing the sensor information and a second sub-window showing the one or more notification options determined by the computerized model. The graphical UI allows a remote user to evaluate the sensor information and select a suggested notification from the notification options. In some embodiments, the user may request additional information via the graphical UI and the computing device before selecting a notification option. In some embodiments, the user may request secondary sensor information via the graphical UI and the computing device before selecting a notification option. In some embodiments, the user may decline all notification options and indicate the sensor information does not require a response or notification (e.g., a false alarm).

When the computing device receives, via the graphical UI, input data indicating a suggested notification from the notification options, the method includes sending a notification to a notification destination. In some embodiments, sending the notification to a notification destination includes sending the notification from the computing device. In some embodiments, sending the notification to a notification destination includes sending the notification from or through a control plane in data communication with the computing device. For example, equipment control commands may be sent from the control plane, while alerts and notifications to operators may be sent from the computing device.

In some embodiments, a graphical UI includes at least a first sub-window and a second sub-window that present graphical information to the user. The first sub-window presents at least a portion of the sensor information received at the computing device.

The second sub-window presents one or more notification options with a user input mechanism that allows a user to indicate one or more of the notification options for selection. In some embodiments, the graphical UI allows the selection of a single notification option. In some embodiments, the graphical UI allows the selection of a plurality of notification options. The graphical UI can allow the simultaneous viewing of the notification options in the second sub-window and the sensor information in the first sub-window. The user can review the suggested notification options in context of the sensor information to make an informed decision based on the sensor information.

In some embodiments, additional information, such as MWD information, drilling interpretations, drilling models, fluid advisor information, and other additional information related to or derived from the sensor information can be displayed to the user in the graphical UI to further inform the user. In some embodiments, the additional information is displayed within the first sub-window with the sensor information. In some embodiments, the additional information is displayed within a third sub-window of the graphical UI.

The graphical UI can allow a remote user to provide instructions to the computing device, control plane, or other components of the system to notify operators at the wellsite or control equipment at the wellsite while having greater computational resources than are available at the wellsite. In some embodiments, a system for wellsite control includes a drill rig and drill string with a BHA connected thereto. In other embodiments, the system includes a well. In the illustrated example, a control cabin is located at the wellsite to control the drill rig. The control cabin is in data communication with the equipment of the drill rig, the drill string, and the BHA. In some embodiments, the control cabin includes or houses a control plane.

In some embodiments, the control cabin is in data communication with one or more sensors of the plurality of sensors located proximate the control cabin (or otherwise at the surface), the drill rig, the drill string, the BHA, the formation, or other locations at the wellsite. The sensor information is provided to a network in communication with the sensors, equipment, and/or control cabin. In some embodiments, the network provides data communication with a computing device and a townsite. In some embodiments, the network provides data communication with a townsite in which the computing device is located. A display device located in the townsite may display a graphical UI provided by the computing device. Notifications from the computing device and/or townsite may be provided to the control plane, the control cabin, the equipment, or other components of the wellsite as well as operators located at or in communication with the wellsite. In some embodiments, an operator located at or in communication with the wellsite that receives the notification sent by the computing device and/or townsite can review and respond to the notification. The operator's response to the notification is, in some embodiments, recorded to the computerized model (e.g., ML model) and used to further refine the accuracy and precision of the notification options and/or selected notification or action within the computerized model.

In some embodiments, a system for wellsite control includes one or more sensors in communication with a computerized model, such as the illustrated ML model. The ML model receives the receives the sensor information and, based on prior training datasets, determines one or more notification options in response to the sensor information (and optionally, additional information). In some embodiments, a remote user selects a notification option from the proposed notifications options via a graphical UI, and the selected notification option is sent to an operator at or in communication with the wellsite. In such examples, the operator may provide to the remote user and/or the ML model a confirmation or take an action based at least partially on the notification. In some embodiments, the confirmation is transmitted to and recorded by the ML model to further train the ML model as to the veracity of the notification. The action taken and/or the result thereof is transmitted to the ML model to further train the ML model as to the action taken and the results of the action. The ML model may further correlate the action and/or results with the selected notification sent to the operator to further determine the effectiveness of the notification, as well as the action.

The ML model may receive the confirmation of the notification and/or of the action to confirm the veracity of the notification selected by the remote user in the UI. In some embodiments, the notification sent based on the user input to the UI includes a user identification ID that allows the notification destination to know or track the source of the user inputs. For example, different user IDs may exhibit different behaviors for which the ML model can account. In other examples, a wellsite operator may contact the remote user based on the user ID to gain further information related to the notification. In some embodiments, the requested further information can be recorded by the ML model to further train the ML model to include such further information in future notifications.

In some embodiments, determining and/or selecting a notification option (such as described herein) is at least partially determined by an ML model or system. As used herein, a "machine learning model" refers to a computer algorithm or model (e.g., a classification model, a regression model, a language model, an object detection model) that can be tuned (e.g., trained) based on training input to approximate unknown functions. For example, an ML model may refer to a neural network or other ML algorithm or architecture that learns and approximates complex functions and generate outputs based on a plurality of inputs provided to the ML model. In some embodiments, an ML system, model, or neural network described herein is an artificial neural network. In some embodiments, an ML system, model, or neural network described herein is a convolutional neural network. In some embodiments, an ML system, model, or neural network described herein is a recurrent neural network. In at least one embodiment, an ML system, model, or neural network described herein is a Bayes classifier. As used herein, a "machine learning system" may refer to one or multiple ML models that cooperatively generate one or more outputs based on corresponding inputs. For example, an ML system may refer to any system architecture having multiple discrete ML components that consider different kinds of information or inputs.

As used herein, an "instance" refers to an input object that may be provided as an input to an ML system to use in generating an output, such as a model, components, subcomponents, and properties or values thereof. For example, an instance may refer to any control or response event at a wellsite. For example, an control or response event may include sensor information prior to or during an event that resulted in a notification being provided to an operator or an equipment control command being provided to a piece of equipment. In some examples, the instance includes results of the notification being provided to an operator or an equipment control command being provided to a piece of equipment. For example, the selected notification option selected by a user and/or the action taken by an operator may be considered instances or portions of instances.

In some embodiments, the ML system has a plurality of layers with an input layer configured to receive at least one input training dataset or input training instance and an output layer, with a plurality of additional or hidden layers therebetween. In some embodiments, the ML system can receive multiple training datasets concurrently and learn from the different training datasets simultaneously.

In some embodiments, the ML system includes a plurality of ML models that operate together. Each of the ML models has a plurality of hidden layers between the input layer and the output layer. The hidden layers have a plurality of input nodes (e.g., nodes), where each of the nodes operates on the received inputs from the previous layer. In a specific example, a first hidden layer has a plurality of nodes and each of the nodes performs an operation on each instance from the input layer. Each node of the first hidden layer provides a new input into each node of the second hidden layer, which, in turn, performs a new operation on each of those inputs. The nodes of the second hidden layer then passes outputs, such as identified clusters, to the output layer.

In some embodiments, each of the nodes has a linear function and an activation function. The linear function may attempt to optimize or approximate a solution with a line of best fit. The activation function operates as a test to check the validity of the linear function. In some embodiments, the activation function produces a binary output that determines whether the output of the linear function is passed to the next layer of the ML model. In this way, the ML system can limit and/or prevent the propagation of poor fits to the data and/or non-convergent solutions.

The ML model includes an input layer that receives at least one training dataset. In some embodiments, at least one ML model uses supervised training. In some embodiments, at least one ML model uses unsupervised training. Unsupervised training can be used to draw inferences and find patterns or associations from the training dataset(s) without known outputs. In some embodiments, unsupervised learning can identify clusters of similar labels or characteristics for a variety of training instances and allow the ML system to extrapolate the designations of instances with similar characteristics.

In some embodiments, semi-supervised learning can combine benefits from supervised learning and unsupervised learning. As described herein, the ML system can identify associated labels or characteristic between instances, which may allow a training dataset with known outputs and a second training dataset including more general input information to be fused. Unsupervised training can allow the ML system to cluster the instances from the second training dataset without known outputs and associate the clusters with known outputs from the first training dataset. The ML model may, thereby, train itself using incomplete instances or via a variety of disparate instances.

The present disclosure relates to methods and systems for wellsite control according to any of the following:

[A1] In some embodiments, a method for wellsite control includes, at a computing device, receiving sensor information from one or more sensors; determining at least one notification option based at least partially on the sensor information; selecting at least one notification option based at least partially on the sensor information; and sending a notification to a notification destination.

[A2] In some embodiments, the sensor information of [A1] includes surface sensor information.

[A3] In some embodiments, the sensor information of [A1] or [A2] includes downhole sensor information.

[A4] In some embodiments, the sensor information of any of [A1] through [A3] includes a physical location of the sensor.

[A5] In some embodiments, the sensor information of any of [A1] through [A4] includes at least one environmental condition of a wellsite.

[A6] In some embodiments, the sensor information of any of [A1] through [A5] includes at least the operating condition of a wellsite.

[A7] In some embodiments, the at least one notification option of any of [A1] through [A6] includes a control command of at least one equipment.
[A8] In some embodiments, the control command of [A7] of the equipment is automated control of the equipment.
[A9] In some embodiments, the sensor information of any of [A1] through [A8] is primary sensor information, and
at least one notification option is based at least partially on the primary sensor information and secondary sensor information received from a different sensor than the primary sensor information.
[A10] In some embodiments, the at least one notification option of any of [A1] through [A9] includes transmitting at least part of the sensor information to the notification destination.
[A11] In some embodiments, at least part of the sensor information sent to the notification destination of [A10] includes an origin of the sensor information.
[A12] In some embodiments, the notification destination of any of [A1] through [A11] is a wellsite operator.
[A13] In some embodiments, the notification destination of any of [A1] through [A11] is a wellsite alarm.
[A14] In some embodiments, the method of any of [A1] through [A13] further comprises receiving a confirmation of the notification from the notification destination.
[A15] In some embodiments, the confirmation of [A14] includes a verification of the sensor information.
[A16] In some embodiments, the confirmation of [A14] includes a verification of accuracy of the notification destination.
[A17] In some embodiments, the confirmation of [A14] includes a response action to the notification.
[A18] In some embodiments, the method of any of [A14] through [A17], further comprising recording the confirmation in a machine learning (ML) model, wherein the at least one notification option is based at least partially on the ML model.
[A1] In some embodiments, a method for wellsite control includes, at a computing device, receiving sensor information from one or more sensors; determining at least one notification option based at least partially on the sensor information; providing for display of a graphical interface, wherein the graphical interface comprises a first sub-window showing the sensor information and the graphical interface further comprises a second sub-window showing one or more notification options based at least partially on the sensor information; receiving, via the graphical interface, input data indicating a suggested notification from the notification options; and sending a notification to a notification destination.
[B2] In some embodiments, the sensor information of [B1] includes surface sensor information.
[B3] In some embodiments, the sensor information of [B1] or [B2] includes downhole sensor information.
[B4] In some embodiments, the sensor information of any of [B1] through [B3] includes a physical location of the sensor.
[B5] In some embodiments, the sensor information of any of [B1] through [B4] includes at least one environmental condition of a wellsite.
[B6] In some embodiments, the sensor information of any of [B1] through [B5] includes at least one operating condition of a wellsite.

[B7] In some embodiments, the at least one notification option of any of [B1] through [B6] includes a control command of at least one equipment.
[B8] In some embodiments, the control command of the equipment of [B7] is automated control of the equipment.
[B9] In some embodiments, the sensor information of any of [B1] through [B8] is primary sensor information, and the at least one notification option is based at least partially on the primary sensor information and secondary sensor information received from a different sensor than the primary sensor information.
[B10] In some embodiments, the at least one notification option of any of [B1] through [B9] includes transmitting at least part of the sensor information to the notification destination.
[B11] In some embodiments, at least part of the sensor information sent to the notification destination of [B10] includes an origin of the sensor information.
[B12] In some embodiments, the notification destination of any of [B1] through [B11] is a wellsite operator.
[B13] In some embodiments, the notification destination of any of [B1] through [B11] is a wellsite alarm.
[B14] In some embodiments, the notification of any of [B1] through [B13] includes a user ID of a remote user providing the user input.
[B15] In some embodiments, the method of [B1] through [B14] further comprises receiving a confirmation of the notification from the notification destination.
[B16] In some embodiments, the confirmation of [B15] includes a verification of the sensor information.
[B17] In some embodiments, the confirmation of [B15] includes a verification of accuracy of the notification destination.
[B18] In some embodiments, the confirmation of [B15] includes a response action to the notification.
[B19] In some embodiments, the method of any of [B15] through [B18] further includes recording the confirmation in an ML model, wherein the at least one notification option is based at least partially on the ML module.
[B20] In some embodiments, the first sub-window and the second sub-window of any of [B1] through [B19] are simultaneously displayed within the graphical interface to allow for comparing at least part of the sensor information and the notification options.
[C1] In some embodiments, a system for wellsite control includes at least one sensor located at a wellsite and a computing device in data communication with the sensor. The computing device includes a processor and a hardware storage device having instructions stored thereon, that when executed by the processor, cause the computing device to perform the method of any of [A1] through [B20].

One or more specific embodiments of the present disclosure are described herein. These described embodiments are examples of the presently disclosed techniques. Additionally, in an effort to provide a concise description of these embodiments, not all features of an actual embodiment may be described in the specification. Accordingly, the terms "wellsite," "wellbore," "borehole," and the like should not be interpreted to limit tools, systems, assemblies, or methods of the present disclosure to any particular industry, field, or environment.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein, to the extent such features are not described as being mutually exclusive. Numbers, percentages, ratios, or other values stated herein are intended to include that value, and also other values that are "about", "substantially", or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims. The described embodiments are therefore to be considered as illustrative and not restrictive, and the scope of the disclosure is indicated by the appended claims rather than by the foregoing description.

What is claimed is:

1. A method for wellsite control, the method comprising:
at a computing device:
receiving a drill plan and wellsite information associated with a wellsite, the drill plan being a plan to drill a well at the wellsite, and the wellsite information including at least one of:
surface information; or
downhole information;
inputting the drill plan and the wellsite information into a machine learning model and determining at least one control command based on at least one of the wellsite information or the drill plan;
transmitting the at least one control command to equipment at the wellsite to change at least one operating parameter of the equipment at the wellsite;
transmitting a notification to a notification destination, wherein the notification is associated with the at least one control command;
receiving a first confirmation of the at least one control command from the notification destination, wherein the first confirmation of the at least one control command includes a first verification that an action taken in conjunction with the at least one control command is accurate;
receiving a second confirmation of the notification from the notification destination, wherein the second confirmation of the notification includes a second verification of a veracity of the notification;
determining a first effectiveness of the action based upon the first confirmation; and
determining a second effectiveness of the notification based on the second confirmation.

2. The method of claim 1, wherein the wellsite information includes sensor information that pertains to at least one of: a physical location of a sensor, at least one environmental condition of the wellsite, or at least one operating condition of the wellsite.

3. The method of claim 1, wherein the wellsite information includes sensor information that pertains to at least one of: downhole sensor information, surface sensor information, fluid sensor information, or equipment sensor information.

4. The method of claim 3, wherein the downhole sensor information includes data from a plurality of accelerometers at different physical locations along a drill string.

5. The method of claim 3, wherein the sensor information is inputted into the machine learning model and at least one notification option is determined based on at least one of the sensor information or the drill plan.

6. The method of claim 5, wherein the machine learning model is configured to receive the sensor information and, based on prior training datasets, determine the at least one notification option based at least partially on the sensor information.

7. The method of claim 5, wherein the at least one notification option includes the control command of the equipment that includes an automated control of the equipment.

8. The method of claim 1, further comprising:
recording the first confirmation of the at least one control command in the machine learning model; and training the machine learning model based on the first verification that the action taken in conjunction with the at least one control command is accurate.

9. A system comprising:
a processor;
memory accessible by the processor;
processor-executable instructions stored in the memory and executable to instruct the system to:
receive a drill plan and wellsite information associated with a wellsite, the drill plan being a plan to drill a well at the wellsite, wherein the wellsite information is collected from the wellsite upon completion of drilling of the well in accordance with the drill plan, the wellsite information including at least one of:
surface information; or
downhole information;
input the drill plan and the wellsite information into a machine learning model and determine at least one control command based on at least one of the wellsite information or the drill plan;

transmit the at least one control command to a notification destination to change at least one operating parameter of at least one equipment at the wellsite;

transmit a notification to the notification destination, wherein the notification is associated with the at least one control command;

receive a first confirmation of the at least one control command from the notification destination, wherein the first confirmation of the at least one control command includes a first verification that an action taken in conjunction with the at least one control command is accurate;

receive a second confirmation of the notification from the notification destination, wherein the second confirmation of the notification includes a second verification of a veracity of the notification;

determine a first effectiveness of the action based upon the first confirmation; and determine a second effectiveness of the notification based on the second confirmation.

10. The system of claim 9, wherein the wellsite information includes sensor information that pertains to at least one of: a physical location of a sensor, at least one environmental condition of the wellsite, or at least one operating condition of the wellsite.

11. The system of claim 9, wherein the wellsite information includes sensor information that pertains to at least one of: downhole sensor information, surface sensor information, fluid sensor information, or equipment sensor information.

12. The system of claim 11, wherein the fluid sensor information includes data of at least one property of a produced fluid.

13. The system of claim 11, wherein the sensor information is inputted into the machine learning model and at least one notification option is determined based on at least one of the sensor information or the drill plan.

14. The system of claim 13, wherein the machine learning model is configured to receive the sensor information and, based on prior training datasets, determine the at least one notification option based at least partially on the sensor information.

15. The system of claim 13, wherein the at least one notification option includes the control command of the at least one equipment that includes an automated control of the at least one equipment.

16. The system of claim 9, wherein the instructions further include: recording the first confirmation of the at least one control command in the machine learning model; and training the machine learning model based on the first verification that the action taken in conjunction with the at least one control command is accurate.

17. A non-transitory computer-readable storage medium storing instructions that when executed by a computer, which includes a processor performs a method, the method comprising:

receiving a drill plan and wellsite information associated with a wellsite, the drill plan being a plan to drill a well at the wellsite, and the wellsite information including at least one of surface information or downhole information;

inputting the drill plan and the wellsite information into a machine learning model and determining at least one control command based on at least one of the wellsite information or the drill plan, wherein the machine learning model comprises a neural network configured to perform supervised, unsupervised, or semi-supervised learning;

transmitting the at least one control command to equipment at the wellsite to change at least one operating parameter of the equipment at the wellsite;

transmitting a notification to a notification destination, wherein the notification is associated with the at least one control command;

recording a first received confirmation of the at least one control command from the notification destination in the machine learning model, wherein the first received confirmation includes a first verification that an action taken in conjunction with the at least one control command is accurate;

recording a second received confirmation of the notification from the notification destination in the machine learning model, wherein the second received confirmation includes a second verification of a veracity of the notification;

determining a first effectiveness of the action based upon the first received confirmation; and determining a second effectiveness of the notification based on the second received confirmation.

18. The non-transitory computer-readable storage medium of claim 17, wherein the method comprises:

training the machine learning model based on the first received confirmation of the at least one control command; and training the machine learning model based on the second received confirmation of the notification.

* * * * *